(12) United States Patent
Ryu

(10) Patent No.: US 8,307,013 B2
(45) Date of Patent: Nov. 6, 2012

(54) METHOD FOR ATTACHING GEOGRAPHICAL TAG TO DIGITAL DATA AND METHOD FOR PROVIDING GEOGRAPHICAL NAME INFORMATION FOR GEOTAGGING

(75) Inventor: Jung-hee Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 12/526,139

(22) PCT Filed: Feb. 5, 2008

(86) PCT No.: PCT/KR2008/000756
§ 371 (c)(1),
(2), (4) Date: Aug. 6, 2009

(87) PCT Pub. No.: WO2008/097050
PCT Pub. Date: Aug. 14, 2008

(65) Prior Publication Data
US 2010/0318580 A1    Dec. 16, 2010

(30) Foreign Application Priority Data
Feb. 8, 2007 (KR) .................. 10-2007-0013039

(51) Int. Cl.
*G06F 17/30* (2006.01)
(52) U.S. Cl. .................. 707/803; 707/E17.018
(58) Field of Classification Search .......... 707/803, 707/E17.018
See application file for complete search history.

(56) References Cited

U.S. PATENT DOCUMENTS

| | | | | |
|---|---|---|---|---|
| 5,634,049 A * | 5/1997 | Pitkin | ............ | 707/803 |
| 6,112,200 A * | 8/2000 | Livshutz et al. | ............ | 707/803 |
| 6,836,781 B2 * | 12/2004 | McDonough | ............ | 707/803 |
| 7,197,498 B2 * | 3/2007 | Perloff | ............ | 707/803 |
| 7,925,677 B2 * | 4/2011 | Sheridan | ............ | 707/803 |
| 8,046,330 B2 * | 10/2011 | Ozaki et al. | ............ | 707/803 |
| 8,224,867 B2 * | 7/2012 | Evans | ............ | 707/803 |
| 2002/0029230 A1 * | 3/2002 | Takiguchi et al. | ............ | 707/500.1 |
| 2003/0194203 A1 * | 10/2003 | Yoshioka et al. | ............ | 386/46 |
| 2005/0021224 A1 * | 1/2005 | Gray | ............ | 701/200 |
| 2005/0241003 A1 * | 10/2005 | Sweeney et al. | ............ | 726/28 |
| 2005/0275726 A1 * | 12/2005 | Abraham et al. | ............ | 348/207.99 |
| 2006/0155462 A1 * | 7/2006 | Sumizawa et al. | ............ | 701/208 |
| 2006/0256212 A1 * | 11/2006 | Choi | ............ | 348/231.99 |
| 2007/0297683 A1 * | 12/2007 | Luo et al. | ............ | 382/224 |
| 2009/0082957 A1 * | 3/2009 | Agassi et al. | ............ | 701/208 |

FOREIGN PATENT DOCUMENTS

| | | |
|---|---|---|
| KR | 10-2004-0068767 A | 8/2004 |
| KR | 10-2005-0037320 A | 4/2005 |
| KR | 10-2006-0042691 A | 5/2006 |
| KR | 10-2006-0118097 A | 11/2006 |
| KR | 10-2006-0135279 A | 12/2006 |

* cited by examiner

*Primary Examiner* — Rehana Perveen
*Assistant Examiner* — Thuy Tiffany Bui
(74) *Attorney, Agent, or Firm* — Husch Blackwell LLP (57) ABSTRACT

Provided are a method for attaching a geographical tag to digital data and a method for providing geographical name information for geotagging. When a digital device periodically provides its position information, the server creates a position database. When the digital device requests geographical name information associated with the digital data, the server estimates the position of the digital device at a time when the digital data was created and transmits geographical name information corresponding to the estimated position to the digital device. The digital device attaches the geographical name information to the digital data.

17 Claims, 7 Drawing Sheets

METHOD FOR ATTACHING GEOGRAPHICAL TAG TO DIGITAL DATA AND METHOD FOR PROVIDING GEOGRAPHICAL NAME INFORMATION FOR GEOTAGGING

CROSS REFERENCE TO RELATED APPLICATIONS

This application is a U.S. National Phase Application of International Application PCT Application No. PCT/KR2008/000756 filed on Feb. 5, 2008, which claims the benefit of priority from Korean Patent Application No. 10-2007-0013039 filed on Feb. 8, 2007. The disclosures of International Application PCT Application No. PCT/KR2008/000756 and Korean Patent Application No. 10-2007-0013039 are incorporated herein by reference.

TECHNICAL FIELD

The present invention relates to geotagging, and more particularly, to a method for attaching a geographical tag to a digital data created by a digital device and a method for providing geographical name information for geotagging.

BACKGROUND ART

As new technologies for mobile communication and wireless Internet are developed, digital devices capable of providing various services have been introduced. The digital devices may include a high-performance processor and a high-capacity memory card for realizing high-speed wireless data communications, e.g., multimedia communications.

The tendency toward digital convergence provides various multimedia functions to the digital devices, e.g., a mobile phone or other portable devices. For example, the above-mentioned multimedia functions include a digital camera function, an MP3 player function, a camcorder function, a portable disk function, a television function, and the like.

Nowadays, a digital device for providing a global positioning system (GPS)-based service has appeared. Sony Corporation disclosed a digital camera having a GPS-based function of providing information on a position where a photograph is taken and a time when the photograph is taken by a digital device. Use of the digital camera allows a user to recognize his/her moving path and an exact position on the moving path at which the user has taken a photograph.

DISCLOSURE OF INVENTION

Technical Problem

However, if information on the position where the photograph was taken is solely provided, the user may not easily remember where and why he or she has taken the photograph. It is also difficult to retrieve photographs taken at a specific place from a great number of photographs by merely using the information on the position. Accordingly, there is a need for a method of geotagging capable of improving convenience of a user, and a service using the same.

Technical Solution

It is, therefore, one object of the present invention to provide a user-friendly method for attaching a geographical tag to a digital data created by a digital device.

It is another object of the present invention to provide a method for providing geographical name information that is associated with a position at which the digital data is created in order to attach an appropriate geographical tag to the digital data conveniently.

Advantageous Effects

In accordance with the present invention, the user can geotag a photograph in a user-friendly manner.

Furthermore, in accordance with the present invention, a digital device acquires geographical name information associated with the photograph from a server in order to geotag the photograph, without having to record too much data in the digital device.

BRIEF DESCRIPTION OF THE DRAWINGS

The above objects and features of the present invention will become more apparent from the following description of the preferred embodiments given in conjunction with the accompanying drawings, in which.

BEST MODE FOR CARRYING OUT THE INVENTION

In accordance with one aspect of the present invention, there is provided a method for geotagging a digital data, the method including the steps of: providing position information of the digital device periodically to a server by a digital device, and creating a position database by using the provided position information by the server; creating the digital data by the digital device; requesting the server to provide geographical name information associated with the digital data by the digital device; receiving the geographical name information from the server; and attaching the geographical name information to the digital data.

In accordance with another aspect of the present invention, there is provided a method for providing geographical name information for geotagging, the method including the steps of: receiving position information of a digital device periodically from the digital device by a server, and creating a position database by using the provided position information by the server; receiving a request for geographical name information associated with the digital data from the digital device by the server; retrieving the geographical name information associated with the digital data; and transmitting the retrieved geographical name information to the digital device.

MODE FOR THE INVENTION

In the following detailed description, reference is made to the accompanying drawings that show, by way of illustration, specific embodiments in which the present invention may be practiced. These embodiments are described in sufficient detail to enable those skilled in the art to practice the present invention. It is to be understood that the various embodiments of the present invention, although different from one another, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention will now be described in more detail, with reference to the accompanying drawings.

Figure 1:
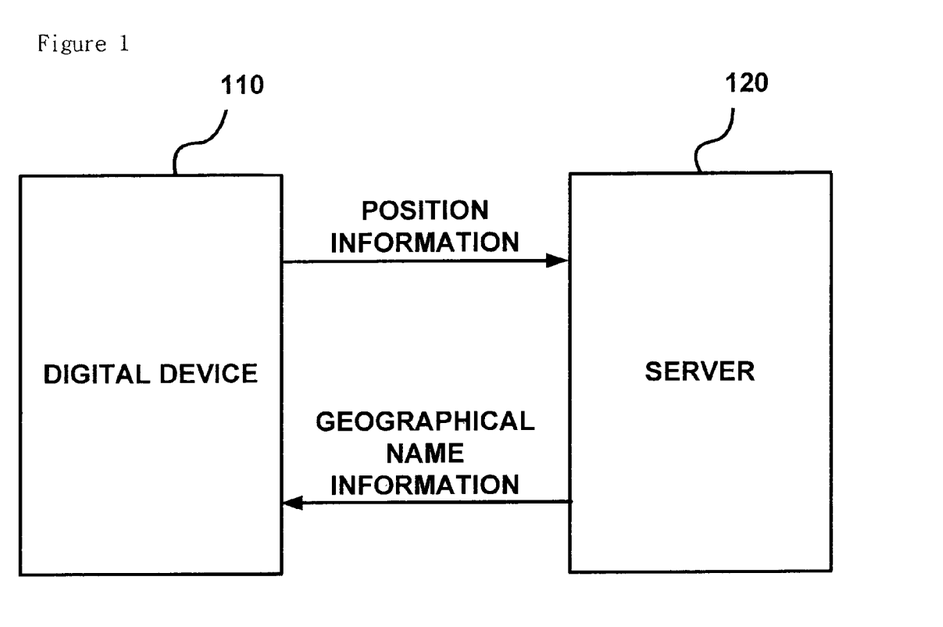
FIG. 1 schematically illustrates a concept of the present invention.

FIG. 1 schematically illustrates a concept of the present invention.

A digital device 110 and a server 120 may be required to implement the present invention.

The digital device 110 transmits its position information to the server 120 and the server 120 creates a position database by using the position information transmitted from the digital device. For example, the digital device 110 may transmit its position information to the server 120 periodically (e.g., at intervals of N seconds) through a so-called idle-screen application which is usually displayed on a portion of a screen of the digital device 110, or transmit the position information to the server 120 whenever a user desires to transmit it. Herein, the idle-screen application may be provided as a form of pop-up for displaying a portal site, such as NAVER, DAUM and the like, on a screen of the digital device 110. Meanwhile, various methods for acquiring the position information of the digital device 110 are disclosed in Korean Patent Application No. 10-2006-0014040 filed on Feb. 14, 2006 by the same applicant as that of the present invention. In detail, by referring to the Korean Patent Application No. 2006-14040, disclosed are methods for acquiring position information by using GPS, by receiving cell ID from a base station, by using network-assisted GPS, or the like.

If the digital device 110 requests the server 120 to provide geographical name information associated with a position at which the digital data was created in order to attach the geographical name information to the digital data, the server 120 estimates the position at which the digital data was created and transmits to the digital device 110 the geographical name information corresponding to the estimated position.

In short, the digital device 110 has functions of (i) creating the digital data, (ii) periodically reporting the position thereof to the server 120, and (iii) receiving the geographical name information corresponding to the estimated position from the server 120 and tagging the same to the created digital data. These functions may be implemented by only one digital device or by a plurality of digital devices.

In case all the functions are implemented by only one digital device, the digital device 110 may be implemented only by one terminal, e.g., a cell phone with a digital camera function. However, in case each of the functions is implemented by a separate terminal, (i) the function of creating digital data may be implemented by a digital camera, (ii) the function of periodically reporting the position to the server may be implemented by a cell phone, and (iii) the function of receiving the geographical name information from the server and tagging the same to the digital data may be implemented by a personal computer (PC). Accordingly, the digital device 110 may include one or more terminal sets, which may be applied to the whole specification and claims of the present invention.

Further, the term "digital data" used in this specification includes a photograph, a moving picture, an SMS, an email, an MP3, web-surfing records, and the like. For conveniences' sake, however, it is assumed that the digital data indicates the photograph.

Moreover, the term "geographical name information" includes a plurality of user-friendly names or geographical names as well as a plurality of position coordinates at which the digital data was created. Herein, the user-friendly names or the geographical names may be common to all users, or associated with a specific user.

Furthermore, the expression "a geographic tag is attached to a digital data" may mean that geographic information is included in an EXIF header of the digital data, or that the geographic information is retrieved from a separate database (DB) by using an application and then the retrieved geographic information is used as the tag.

However, the meanings of the above-mentioned terms and expression are not limited thereto.

Figure 2:
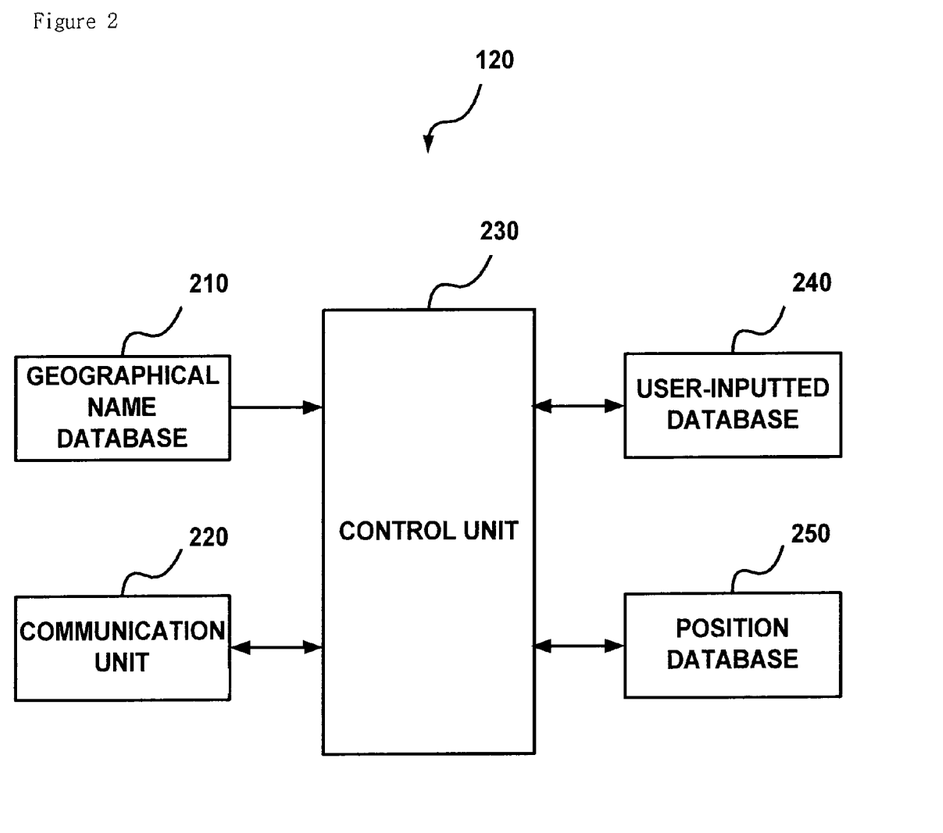
FIG. 2 is a block diagram illustrating a configuration of a server in accordance with the present invention.

FIG. 2 is a block diagram illustrating a configuration of a server in accordance with the present invention.

The server 120 includes a communication unit 220 for communicating with the digital device 110, a geographical name database 210 for storing the geographical name information which corresponds to each position coordinate, and a position database 250 for storing time-varying position of the digital device 110 which is being located. Moreover, the server 120 may also include a user-inputted database 240, which will be described later in detail.

The server 120 receives the position information of the digital device 110 periodically, e.g., at intervals of 3 minutes from the idle-screen application of the digital device 110. Herein, the intervals at which the position information is received may not be fixed.

In another example, a user may manually operate the digital device 110 to transmit the position information to the server 120 at a desired time, instead of using the idle-screen application of the digital device 110. For example, the user may request a web page made out of Hypertext Markup Language (HTML) by aid of Wireless Application Protocol (WAP) and WINC, and then transmit the position information to the server 120.

The server 120 creates the position database 250 by using the position information transmitted from the digital device 110. The position database 250 may include the position information and a time at which the digital device 110 transmitted the position information. For example, the position database 250 may have a configuration as shown in Table 1.

TABLE 1

| Time (Year, Month, Day, Hour, Minute) | Position (Latitude, Longitude) |
|---|---|
| 2007.01.01 09:00 | (X1, Y1) |
| 2007.01.01 09:03 | (X2, Y2) |

TABLE 1-continued

| Time (Year, Month, Day, Hour, Minute) | Position (Latitude, Longitude) |
|---|---|
| 2007.01.01 09:06 | (X3, Y3) |
| 2007.01.01 09:09 | (X4, Y4) |
| 2007.01.01 09:12 | (X5, Y5) |
| 2007.01.01 09:15 | (X6, Y6) |

Thereafter, if the digital device 110 requests the server 120 to provide geographical name information suitable for a specific photograph, the server 120 estimates the position of the digital device 110 by referring to the position database 250.

In detail, when it is assumed that a time at which the geographical name information is requested is $t_m$, times adjacent to $t_m$ among times at which the digital device 110 transmits the position information are $t_k$ and $t_{k+1}$, and the positions of the digital device 110 at the times $t_k$ and $t_{k+1}$ are $f(t_k)$ and $f(t_{k+1})$, respectively, the position of the digital device 110 at time $t_m$ may be estimated by using a function of $f(t_k)$ and $f(t_{k+1})$.

In one example, the position of the digital device 110 may be estimated by the interpolation method. In another example, the position of the digital device 110 may be estimated by using a value of $f(t_k)$ if $t_m$ is nearer to $t_k$ than to $t_{k+1}$ or a value of $f(t_{k+1})$ if $t_m$ is nearer to $t_{k+1}$ than to $t_k$.

For example, if the digital device 110 takes a photograph at 2007.01.01 09:02, the server 120 may estimate the position of the digital device 110 at 2007.01.01 09:02 through the interpolation method, resulting in ((X1+2×2)/3, (Y1+2Y2)/3).

The server 120 retrieves geographical name information corresponding to the estimated position from the geographical name database 210, and transmits the retrieved geographical name information to the digital device 110. The geographical name database 210 may include a user-friendly geographical name corresponding to each of the estimated positions (coordinate values). There may be one geographical name or multiple geographical names which correspond to a specific position. For example, geographical names corresponding to one specific position may be "Vicinity of San Francisco airport" and "San Francisco Theater".

In case there are multiple geographical names corresponding to the specific position, the server 120 may transmit all the geographical names to the digital device 110.

Meanwhile, the user may manually input a specific geographical name for the specific position. In this case, the digital device 110 may transmit the user-inputted geographical name to the server 120. The server 120 may create the user-inputted database 240 by using the user-inputted geographical name. For example, the user-inputted database 240 may include a specific geographical name, e.g., "Vicinity of Jane s house", which may be recommended as a tag for a digital data if the digital data is created at the specific position.

To sum up, the server 120 retrieves one or more geographical names corresponding to the estimated position of the digital device 110 from both the geographical name database 210 and the user-inputted database 240, and transmits the retrieved geographical names to the digital device 110.

While the server 120 of FIG. 2 includes the geographical name database 210 and the user-inputted database 240, it may also be implemented by varying the number of the databases.

Figure 3:
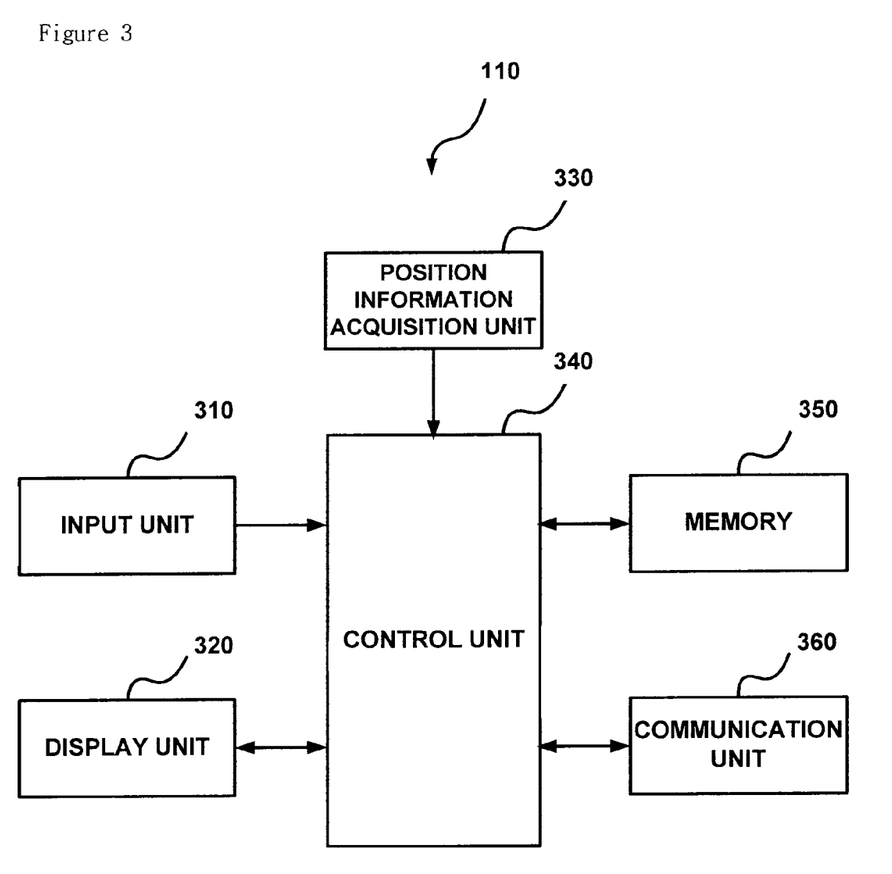
FIG. 3 is a block diagram illustrating a configuration of a digital device in accordance with the present invention.

FIG. 3 is a block diagram illustrating a configuration of the digital device 110 in accordance with the present invention.

The digital device 110 includes a position information acquisition unit 330 for acquiring the position information of the digital device 110, an input unit 310 for receiving a user command for controlling itself, a display unit 320, a memory 350, a communication unit 360 for communicating with the server 120, and a control unit 340.

The position information acquisition unit 330 acquires the position information at which the digital device 110 is being located.

The communication unit 360 periodically transmits the position information to the server 120. Moreover, the communication unit 360 also requests the server 120 to provide geographical name information for a photograph when the digital device 110 has taken the photograph. The communication unit 360 may request the server 120 to provide the geographical name information for the photograph right after the photograph is created by the digital device 110, or the communication unit 360 may request the server 120 to provide the geographical name information in the future. For example, the communication unit 360 may request the geographical name information for the photograph when the digital device 110 transmits the position thereof to the server 120.

In case the digital device 110 requests the geographical name information immediately after the photograph is created by the digital device 110, the digital device 110 does not have to transmit time information to the server 120. However, in case the digital device 110 requests the geographical name information when transmitting the position thereof, the digital device 110 must also transmit the time information, i.e., a time at which the photograph was taken, to the server 120. That is because the time at which the photograph was taken may be different from the time at which the geographical name information was requested.

Meanwhile, the communication unit 360 receives, from the server 120, the geographical name information that may include one or more geographical names. In this case, the user may select one among the geographical names by using the input unit 310.

If a desired geographical name is not included in the received geographical name information, the user may manually input the desired geographical name for the photograph. Then, the communication unit 360 transmits the desired geographical name to the server 120.

The control unit 340 controls the operation of the digital device 110 according to a predetermined program, and attaches the selected geographical name or the manually inputted geographical name to the photograph. The manually inputted geographical name may be recommended as a tag.

As described above, the digital device 110 of FIG. 3 may be composed of a plurality of device sets. In this case, the functions of (i) creating the digital data, (ii) periodically reporting the position of the digital device 110 to the server 120, and (iii) receiving the geographical name information corresponding to the estimated position from the server 120 and tagging the same to the digital data, may be performed by a digital camera, a cell phone, and a PC, respectively.

Figure 4:
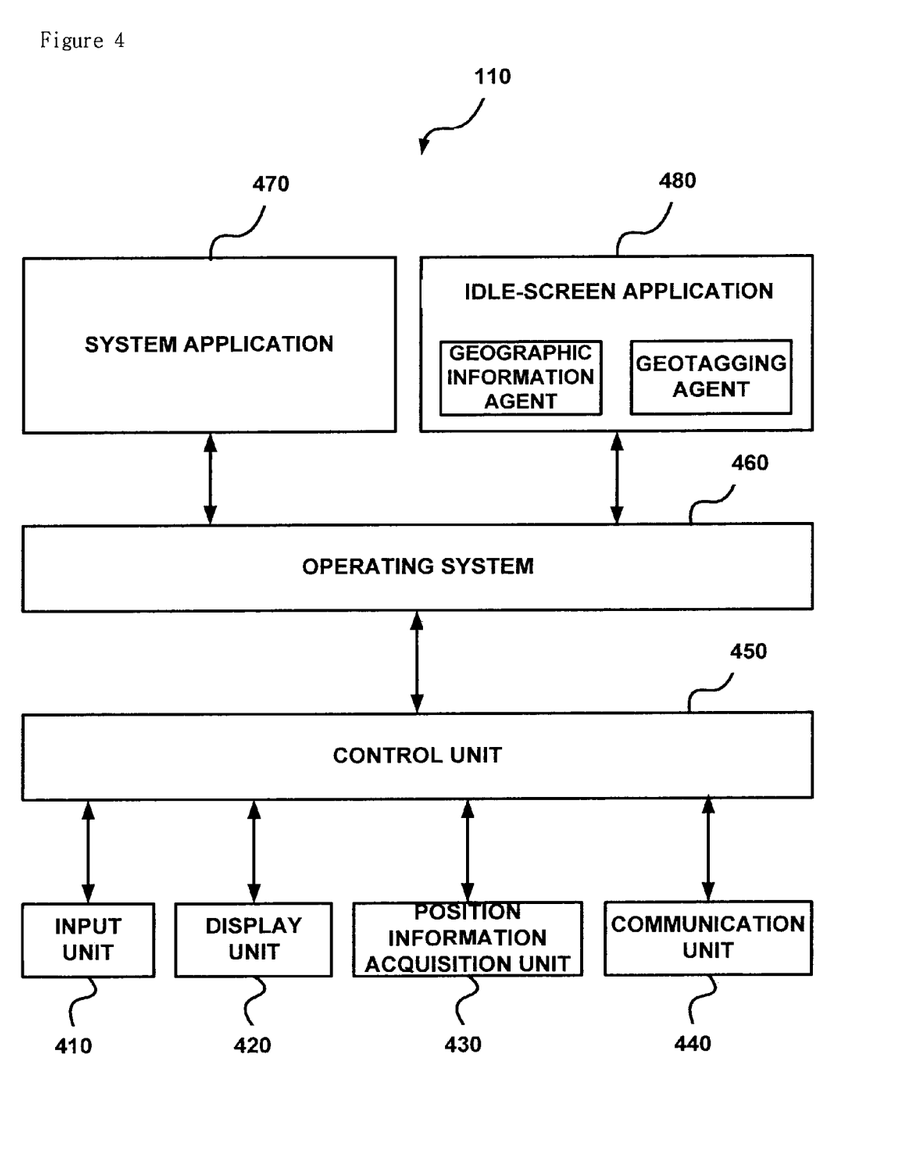
FIG. 4 illustrates a platform of the digital device in accordance with the present invention.

FIG. 4 illustrates a platform of the digital device 110 in accordance with the present invention.

The digital device 110 includes an input unit 410; a display unit 420; a position information acquisition unit 430; a communication unit 440; a control unit 450 for controlling the input unit 410, the display unit 420, the position information acquisition unit 430, and the communication unit 440; an operating system 460; a system application 470 for controlling a basic operation thereof; and an idle-screen application 480 including a geographic information agent and a geotagging agent.

In FIG. 4, the geographic information agent and the geotagging agent are included in the idle-screen application 480, but may be implemented so as to be included in the system application 470.

The geographic information agent let the position information of the digital device 110 acquired by the position information acquisition unit 430 be transmitted to the server 120 via the communication unit 440, and the geographical name information be received from the server 120 via the communication unit 440.

The geotagging agent provides a tagging service for the photograph taken by the digital device 110. When the geographical name information associated with the photograph is received, the geotagging agent provides a pointing service so that the user can select one among a plurality of geographical names included in the received geographical name information. In case no geographical name is suitable for the selection, the geotagging agent also provides a manual input service so that the user can input the geographical name suitable for the photograph.

When the user selects or manually inputs the geographical name for the photograph, the geographic information agent transmits the selected geographical name or the manually inputted geographical name to the server 120 via the communication unit 440. The server 120 may create the user-inputted database 240 by using the received geographical name as shown in FIG. 2.

Figure 5:
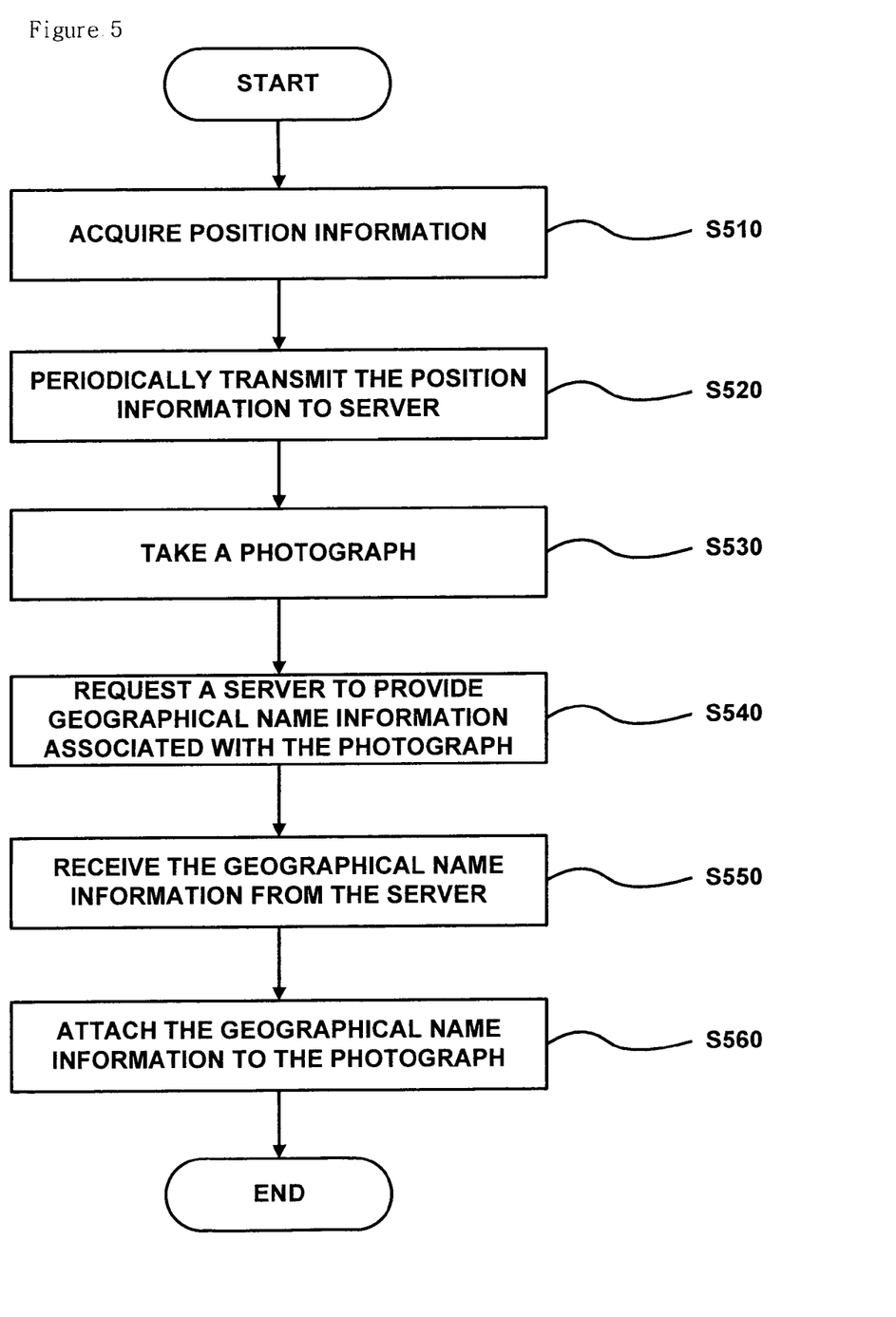
FIG. 5 is a flowchart illustrating a process of attaching a geographical tag to a photograph in accordance with an example embodiment of the present invention.

FIG. 5 is a flowchart illustrating a process of geotagging a photograph in accordance with an example embodiment of the present invention.

The digital device acquires position information (S510). The position information may be acquired by using the method as described above or the like.

The digital device periodically transmits the position information thereof to the server (S520). Alternatively, the digital device may aperiodically transmit the position information thereof to the server. The server creates the position database by using the transmitted position information.

The digital device takes a photograph (S530). After taking the photograph, the digital device requests the server to provide geographical name information for the photograph (S540). The server estimates the position at which the digital device has taken the photograph, and retrieves the geographical name information corresponding to the estimated position.

The server transmits the geographical name information to the digital device (S550).

Upon receipt of the geographical name information, the digital device selects a desired geographical name and easily attaches the desired geographical name as a tag to the photograph (S560).

Figure 6:
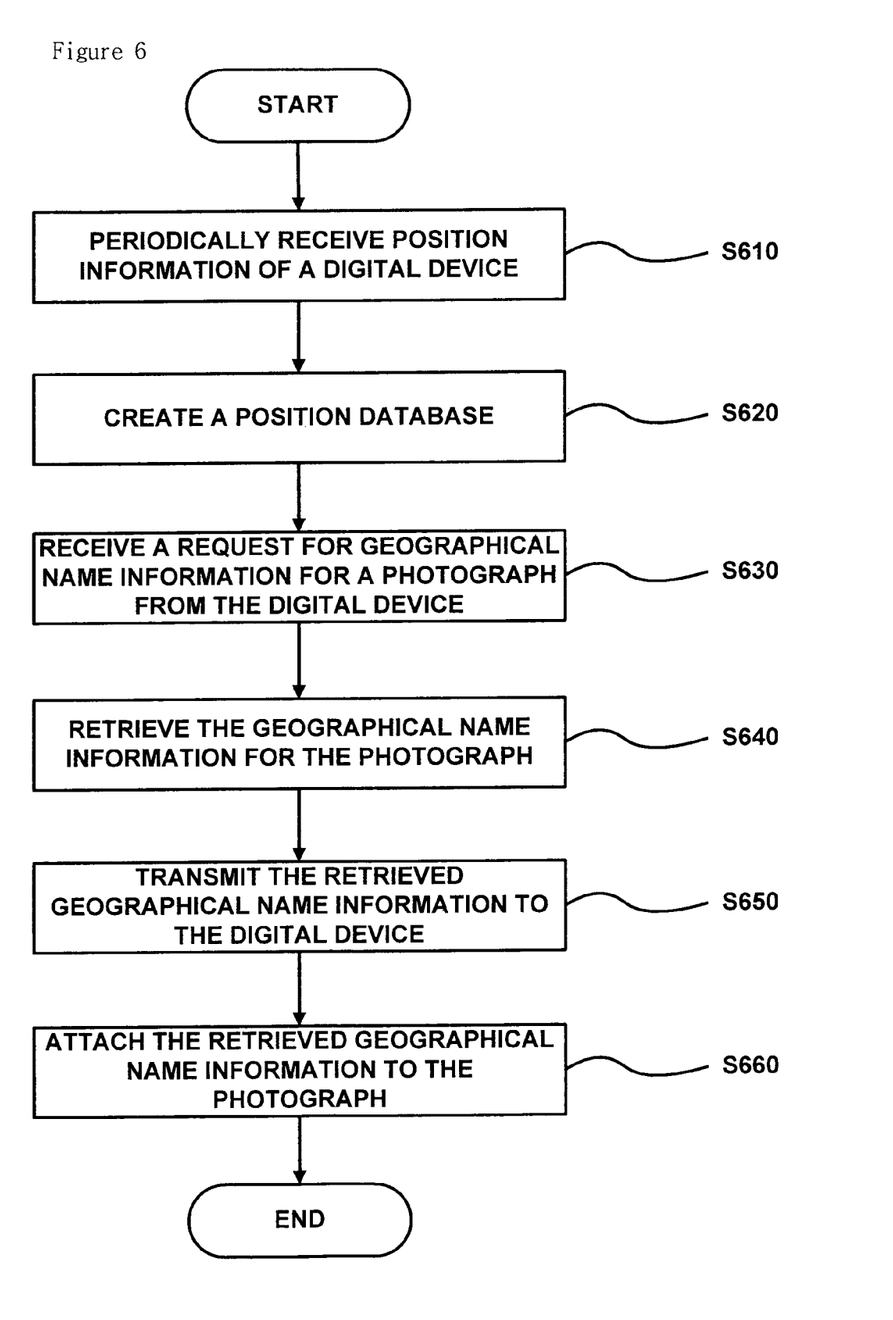
FIG. 6 is a flowchart illustrating a process of providing geographical name information for geotagging in accordance with another example embodiment of the present invention.

FIG. 6 is a flowchart illustrating a process of providing geographical name information for geotagging in accordance with another example embodiment of the present invention.

The server periodically receives position information from the digital device (S610). Using the received position information, the server creates the position database (S620).

When a request for geographical name information for a photograph is received from the digital device (S630), the server retrieves the geographical name information for the photograph (S640). In other words, the server estimates the position at which the photograph has been taken by the digital device, and retrieves the geographical name information corresponding to the estimated position.

Then, the server transmits the retrieved geographical name information to the digital device (S650).

Thereafter, the digital device geotags the photograph and then transmits the geotagged information to the server. The server may update the user-inputted database by using the geotagged information (S660).

Figure 7:
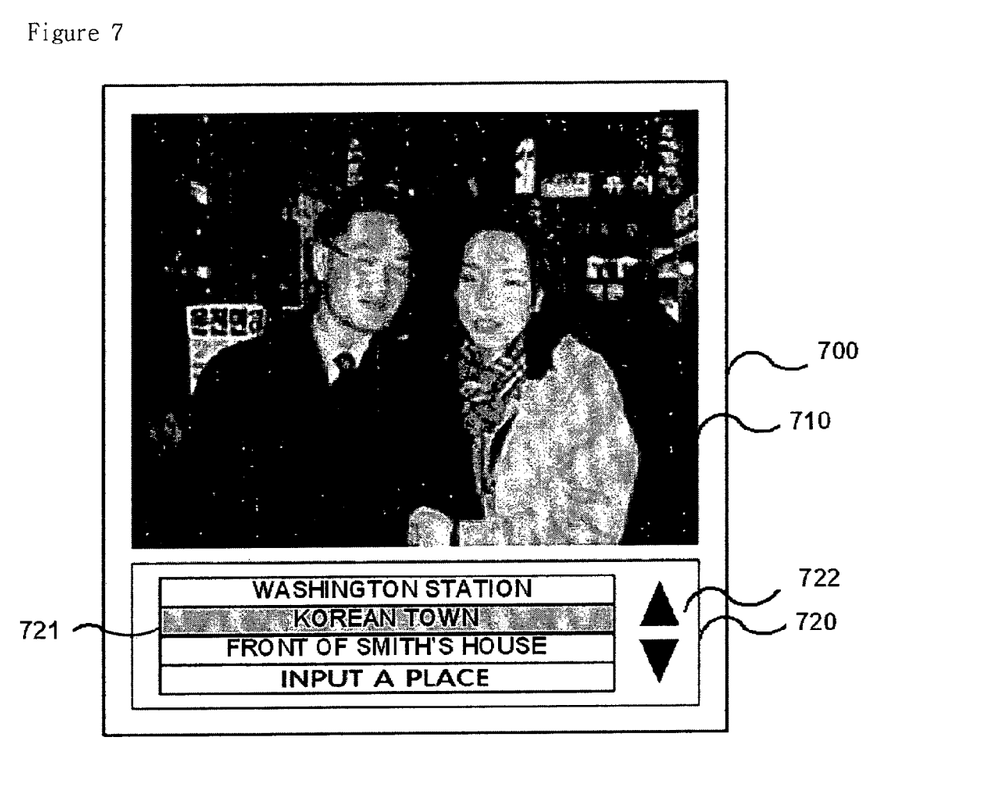
FIG. 7 illustrates an example of providing a pointing service enabling a user to attach the geographical tag to the photograph in accordance with the present invention.

FIG. 7 illustrates an example of providing to a user a pointing service for geotagging a photograph in accordance with the present invention.

The photograph 710 which has been taken by the digital device may be displayed through the display unit 700 of the digital device. The digital device provides a pointing service so that the user can select a desired one among the geographical names displayed in the area 720. The area 720 includes a first area 721 for displaying the geographical names, and a second area 722 for moving an activated box to select the desired one among the geographical names. That is, the geographical names included in the geographical name information received from the server are displayed on the first area 721, and the user may press select buttons included in the second area 722 to select the desired one among the geographical names.

The geographical names may include a specific name associated with a specific user, such as "Front of Smith s House", as well as a general name, such s "Washington Station" or "Korean Town". As described above, the general name may be provided from the geographical name database included in the server, and the specific name associated with the specific user may be provided from the user-inputted database.

A portion, saying "Input a place", in the first area 721, is displayed to allow the user to manually input a desired specific name for the photograph.

While the present invention has been shown and described with respect to the preferred embodiments, it will be understood by those skilled in the art that various changes and modifications may be made without departing from the spirit and the scope of the present invention as defined in the following claims.

The invention claimed is:

1. A method for geotagging a digital data, the method comprising the steps of:
providing, at a set interval of time, geographic position information of a digital device to a server by the digital device so that the server creates a position database based on the geographic position information wherein the position database includes the geographic position information and a time at which the digital device transmits the geographic position information;
creating digital data by the digital device;
requesting the server to provide geographical name information associated with the digital data based on the geographic position information of the digital device;
receiving the geographical name information from the server; and
associating the geographical name information to the digital data,
wherein the geographic position information and a time at which the digital device provides the geographic position information to the server are recorded in the position database,
wherein, in case the time at which the digital device provides the geographic position information to the server is different from a time at which the digital device requests the server to provide the geographical name information associated with the digital data, a position of the digital device at a time $t_m$ is determined by a function of $f(t_k)$ and $f(t_{k+1})$ in which $t_k$ and $t_{k+1}$ denote times at which the digital device provides the geographic information, the times $t_k$ and $t_{k+1}$ being adjacent to the time $t_m$ at which the digital device requests the server to provide the geographical name information, and $f(t_k)$ and $f(t_{k+1})$ denote positions of the digital device at the times $t_k$ and $t_{k+1}$, respectively, wherein the position of the digital device at the time $t_m$ is determined by interpolation using $f(t_k)$ and $f(t_{k+1})$.

2. The method of claim 1, wherein the step of providing the geographic position information includes the step of providing the geographic position information through an idle-screen service.

3. The method of claim 1, wherein the geographical name information includes a plurality of geographical names.

4. The method of claim 3, wherein the step of associating the geographical name information includes the step of providing to a user a pointing service capable of selecting at least one among the plurality of geographical names.

5. The method of claim 1, further comprising the step of providing a manual input service for allowing a user to input a user-inputted geographical name associated with the digital data if the geographical name information received from the server does not include a desired geographical name.

6. The method of claim 5, further comprising the step of transmitting the user-inputted geographical name to the server, wherein, if the digital device requests the server to provide the geographical name information associated with the digital data, the server transmits the geographical name information together with the user-inputted geographical name.

7. A method for geotagging a digital data, the method comprising the steps of:

providing, at a set interval of time, geographic position information of a digital device to a server by the digital device so that the server creates position database based on the geographic position information wherein the position database includes the geographic position information and a time at which the digital device transmits the geographic position information;

creating digital data by the digital device;

requesting the server to provide geographical name information associated with the digital data based on the geographic position information of the digital device;

receiving the geographical name information from the server; and associating the geographical name information to the digital data, wherein the geographic position information and a time at which the digital device provides the geographic position information to the server are recorded in the position database, wherein, in case the time at which the digital device provides the geographic position information to the server is different from a time at which the digital device requests the server to provide the geographical name information associated with the digital data, a position of the digital device at a time $t_m$ determined by a function of $f(t_k)$ and $f(t_{k+1})$ in which $t_k$ and $t_{k+1}$ denote times at which the digital device provides the geographic information, the times $t_k$ and $t_{k+1}$ being adjacent to the time $t_m$ at which the digital device requests the server to provide the geographical name information, and $f(t_k)$ and $f(t_{k+1})$ denote positions of the digital device at the times $t_k$ and $t_{k+1}$, respectively, wherein the position of the digital device is determined to be $f(t_k)$ in case $t_m$ is nearer to $t_{k+1}$ than to $t_{k+1}$ or $f(t_{k+1})$ in case $t_m$ is nearer to $t_{k+1}$ than to $t_k$.

8. The method of claim 7, wherein the geographic position information is provided not at regular intervals of time but at variable intervals of time and the geographic position information is provided to the server by manually manipulating the digital device.

9. A method for providing geographical name information for geotagging, the method comprising the steps of:

receiving, at a set interval of time, geographic position information of a digital device from the digital device by a server, and creating a position database based on the geographic position information wherein the position database includes the geographic position information and a time at which the digital device transmits the geographic position information;

upon receiving a request for geographical name information associated with digital data from the digital device, retrieving the geographical name information associated with the digital data based on the geographic position information of the digital device; and transmitting the retrieved geographical name information to the digital device, wherein the geographic position information and a time at which the server receives the geographic position information from the digital device are recorded in the position database, wherein, in case the time at which the server receives the geographic position information from the digital device is different from a time at which the server is requested to provide the geographical name information associated with the digital data by the digital device, a position of the digital device at a time $t_m$ is determined by a function of $f(t_k)$ and $f(t_{k+1})$ in which $t_k$ and $t_{k+1}$ denote times at which the digital device provides the geographic information, the times $t_k$ and $t_{k+1}$ being adjacent to the time $t_m$ at which the digital device requests the server to provide the geographical name information, and $f(t_k)$ and $f(t_{k+1})$ denote positions of the digital device at the times $t_k$ and $t_{k+1}$, respectively, wherein the position of the digital device at the time $t_m$ is determined by interpolation using $f(t_k)$ and $f(t_{k+1})$.

10. The method of claim 9, wherein the geographic position information and a time at which the digital device provides the geographic position information are recorded in the position database.

11. The method of claim 9, wherein the step of retrieving the geographical name information includes:

estimating a position of the digital device based on a time at which the server receives the request for geographical name information; and retrieving the geographical name information corresponding to the estimated position.

12. The method of claim 9, further comprising the step of receiving a user-inputted geographical name, which is manually inputted by a user as a tag for the digital data, wherein, if the server is requested to provide the geographical name information associated with the digital data by the digital device, the server transmits the geographical name information together with the user-inputted geographical name.

13. The method of claim 9, wherein the digital device provides the geographic position information to the server through an idle-screen service.

14. A method for providing geographical name information for geotagging, the method comprising the steps of:

receiving, at a set interval of time, geographic position information of a digital device from the digital device by a server, and creating a position database based on the geographic position information wherein the position database includes the geographic position information and a time at which the digital device transmits the geographic position information, upon receiving a request for geographical name information associated with digital data from the digital device, retrieving the geographical name information associated with the digital data based on the geographic position information of the digital device; and transmitting the retrieved geographical name information to the digital device, wherein the geographic position information and a time at which the server receives the geographic position information from the digital device are recorded in the position database, wherein, in case the time at which the server receives the geographic position information from the digital device is different from a time at which the server is requested to provide the geographical name information associated with the digital data by the digital device, a position of the digital device at a time $t_m$ is determined by a function of $f(t_k)$ and $f(t_{k+1})$ in which $t_k$ and $t_{k+1}$ denote times at which the digital device provides the geographic information, the times $t_k$ and $t_{k+1}$ being adjacent to the time $t_m$ at which the digital device requests the server to provide the geographical name information, and $f(t_k)$ and $f(t_{k+1})$ denote positions of the digital device at the times $t_k$ and $t_{+1}$, respectively, wherein the position of the digital device is determined to be $f(t_k)$ in case $t_m$ is nearer to $t_k$ than to $t_{k+1}$ or $f(t_{30\ 1})$ in case $t_m$ is nearer to $t_{k+1}$ than to $t_k$.

15. The method of claim 14, wherein the geographic position information is provided not at regular intervals of time but at variable intervals of time and the server receives the geographic position information which is manually inputted by manipulating the digital device.

16. One or more non-transitory computer-readable media having stored thereon a computer program that, when executed by one or more processors, causes the one or more processors to perform acts including:

providing, at a set interval of time, geographic position information of a digital device to a server by the digital device so that the server creates a position database based on the geographic position information wherein the position database includes the geographic position information and a time at which the digital device transmits the geographic position information;

creating digital data by the digital device;

requesting the server to provide geographical name information associated with the digital data based on the geographic position information of the digital device;

receiving the geographical name information from the server; and associating the geographical name information to the digital data, wherein the geographic position information and a time at which the digital device provides the geographic position information to the server are recorded in the position database, wherein, in case the time at which the digital device provides the geographic position information to the server is different from a time at which the digital device requests the server to provide the geographical name information associated with the digital data, a position of the digital device at a time $t_m$ is determined by a function of $f(t_k)$ and $f(t_{k+1})$ in which $t_k$ and $t_{k+1}$ denote times at which the digital device provides the geographic information, the times $t_k$ and $t_{k+1}$ being adjacent to the time $t_m$ at which the digital device requests the server to provide the geographical name information, and $f(t_k)$ and $f(t_{k+1})$ denote positions of the digital device at the times $t_k$ and $t_{k+1}$, respectively, wherein the position of the digital device at the time $t_m$ is determined by interpolation using $f(t_k)$ and $f(t_{k+1})$.

17. One or more non-transitory computer-readable media having stored thereon a computer program that, when executed by one or more processors, causes the one or more processors to perform acts including:

providing, at a set interval of time, geographic position information of a digital device to a server by the digital device so that the server creates a position database based on the geographic position information wherein the position database includes the geographic position information and a time at which the digital device transmits the geographic position information;

creating digital data by the digital device;

requesting the server to provide geographical name information associated with the digital data based on the geographic position information of the digital device;

receiving the geographical name information from the server; and associating the geographical name information to the digital data, wherein the geographic position information and a time at which the digital device provides the geographic position information to the server are recorded in the position database, wherein, in case the time at which the digital device provides the geographic position information to the server is different from a time at which the digital device requests the server to provide the geographical name information associated with the digital data, a position of the digital device at a time $t_m$ is determined by a function of $f(t_k)$ and $f(t_{k+1})$ in which $t_k$ and $t_{k+1}$ denote times at which the digital device provides the geographic information, the times $t_k$ and $t_{k+1}$ being adjacent to the time $t_m$ at which the digital device requests the server to provide the geographical name information, and $f(t_k)$ and $f(t_{k+1})$ denote positions of the digital device at the times $t_k$ and $t_{k+1})$, respectively, wherein the position of the digital device is determined to be $f(t_k)$ in case $t_m$ is nearer to $t_{k+1}$ than to $t_{k+1\ or\ f(tk+1)}$) in case $t_m$ is nearer to $t_{k+1}$ than to $t_k$.

\* \* \* \* \*